(12) United States Patent
Krapf et al.

(10) Patent No.: US 9,660,809 B2
(45) Date of Patent: May 23, 2017

(54) CROSS-SITE REQUEST FORGERY DEFENSE

(71) Applicant: Adobe Systems Incorporated, San Jose, CA (US)

(72) Inventors: Lars Krapf, Basel (CH); Gilles Knobloch, Riedisheim (FR); Damien Antipa, Saint-Louis (FR); Christanto Leonardo, Basel (CH); Antonio Sanso, Allschwil (CH)

(73) Assignee: Adobe Systems Incorporated, San Jose, CA (US)

( * ) Notice: Subject to any disclaimer, the term of this patent is extended or adjusted under 35 U.S.C. 154(b) by 13 days.

(21) Appl. No.: 14/820,607

(22) Filed: Aug. 7, 2015

(65) Prior Publication Data

US 2017/0041144 A1    Feb. 9, 2017

(51) Int. Cl.
*H04L 29/06* (2006.01)
*H04L 9/32* (2006.01)

(52) U.S. Cl.
CPC ............ *H04L 9/3234* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 7,644,286 B1 * | 1/2010 | Mohr | G06F 21/6209 713/185 |
| 7,702,794 B1 * | 4/2010 | Hall | H04L 63/0815 709/227 |
| 8,020,193 B2 | 9/2011 | Bhola et al. | |
| 8,424,073 B2 * | 4/2013 | Sturms | G06F 17/3089 713/159 |
| 8,438,649 B2 * | 5/2013 | Ichnowski | H04L 67/02 726/26 |
| 8,495,135 B2 | 7/2013 | Amit et al. | |
| 8,505,106 B1 * | 8/2013 | Bhosle | H04L 9/3213 709/206 |
| 8,839,424 B2 | 9/2014 | Hansen | |
| 2008/0115201 A1 * | 5/2008 | Sturms | G06F 17/3089 726/9 |
| 2011/0283110 A1 * | 11/2011 | Dapkus | G06F 21/577 713/182 |

(Continued)

*Primary Examiner* — Izunna Okeke
*Assistant Examiner* — Malcolm Cribbs
(74) *Attorney, Agent, or Firm* — Finch & Maloney PLLC (57) ABSTRACT

An HTML document includes a JavaScript element that manages CSRF token use. When the HTML document is rendered, the JavaScript element asynchronously requests a CSRF token from the server. In response, the server generates a JWT using a keyed HMAC algorithm. The resulting JWT, which functions as a CSRF token, is returned to the user where it is stored in a protected variable inside the JavaScript element. The CSRF token is therefore stateless and isn't stored in a server-side repository. When the user later requests access to a server resource, the CSRF token is included in such request. This may be accomplished by adding a hidden input field that includes the CSRF token to the submission that's transmitted to the server. If the server cannot validate the received token using the HMAC key that was originally used to generate the token, the request is considered unauthorized and is not processed.

19 Claims, 5 Drawing Sheets

(56) References Cited

U.S. PATENT DOCUMENTS

| | | |
|---|---|---|
| 2012/0137363 A1 | 5/2012 | Meliksetian et al. |
| 2013/0198236 A1* | 8/2013 | Lissack ............... G06F 17/3007 707/783 |
| 2014/0137248 A1* | 5/2014 | Gajda ..................... G06F 21/00 726/23 |
| 2014/0315571 A1* | 10/2014 | Saari ..................... H04W 64/00 455/456.1 |
| 2016/0156700 A1* | 6/2016 | Chen ....................... H04L 67/10 726/3 |

* cited by examiner

CROSS-SITE REQUEST FORGERY DEFENSE

FIELD OF THE DISCLOSURE

This disclosure relates generally to authentication of network communications, and more specifically to techniques for defending against cross-site request forgery attacks.

BACKGROUND

A cross-site request forgery (CSRF) attack is a type of computer attack that occurs when an attack perpetrator submits an illegitimate request to a targeted server using a security credential that is misappropriated from an authorized user. The perpetrator will often initiate the CSRF attack by tricking the authorized user into activating a reference, such as a hyperlink, at a server other than the targeted server, such as at a website operated by the perpetrator. The activated reference generates the illegitimate request and routes it to the targeted server using a resource provided by the authorized user, such as the authorized user's web browser. The authorized user's browser, in accordance with standard hypertext transfer protocol (HTTP) processing, automatically adds the appropriate security credential to the request when it is submitted to the targeted server. Because the targeted server cannot detect that the request was forged by an unauthorized user with a misappropriated security credential, it responds to the request as normal. The CSRF attack can therefore be understood as exploiting the trust that the server has in the authorized user, and in the particular context of HTTP communications, in the authorized user's browser. A CSRF attack is thus distinguishable from a man-in-the-middle (MitM) attack, which occurs when an attacker secretly relays—and possibly alters—communications between two parties, such as a server and a trusted user. The impact of a successful CSRF attack therefore varies greatly depending on the role of the authorized user whose security credential is misappropriated. This is because the CSRF attack allows the perpetrator to perform transactions that normally only the authorized user would have been allowed to perform. One way of defending against CSRF attacks is by including an unpredictable challenge token, in addition to the security credential, with each server request. This unpredictable challenge token can be generated, for example, by a web form or a hypertext markup language (HTML) link. Another way of defending against CSRF attacks is to configure the web server to refuse to respond to requests received from a client after a predetermined time since a first communication with the client.

DETAILED DESCRIPTION

A number of techniques have been developed to defend against CSRF attacks. As noted previously, one way of defending against CSRF attacks is by appending an unpredictable challenge token to each server request. The server verifies that an incoming request contains the correct token before the request is processed. Another frequently-invoked defense involves requiring the server to validate an HTTP referrer header that is included in a received request. Only requests from trusted sources, for example as may be included on a whitelist, are processed. Time-based restrictions have also been implemented. While techniques such as these can provide some degree of protection against CSRF attacks, they still suffer from a number of shortcomings. For example, existing CSRF defense techniques do not scale well to load balanced computing environments where a request may be submitted to any one of a number of different servers comprising a server cluster. Existing techniques also make it difficult to cache HTML forms and other resources that are to be used to submit the server request long after the original HTML form is provided to the client. Existing CSRF defense techniques also tend to lack transparency, meaning that software developers who wish to add new functionality to a website must specifically configure new components to interface with an existing CSRF defense framework. Moreover, existing CSRF defense techniques often cannot handle offline operations transparently, and thus force users to reinitiate their browsing sessions after working offline, or even after a brief idle period. These shortcomings in scalability, cacheability, transparency, and offline support represent substantial obstacles to developing a secure and robust framework for defending against CSRF attacks.

Thus, and in accordance with certain of the embodiments disclosed herein, improved techniques are provided for defending against CSRF attacks. In one implementation, an HTML document hosted at a server includes a JavaScript element that manages CSRF token use. The HTML document is served to a trusted user using a secure communication protocol, such as HTTPS, thus providing reasonable protection from eavesdroppers and MitM attacks. When the HTML document is rendered by the trusted user, the JavaScript element asynchronously requests a CSRF token from the server. Upon receiving the token request, the server generates a JavaScript Object Notation (JSON) Web Token (JWT) using a keyed hash message authentication code (HMAC) algorithm. The resulting JWT, which functions as an improved CSRF token, is sent back to the trusted user, where it is stored in a protected variable inside the closure of the JavaScript element in the HTML document. These subsequent interactions between the server and the trusted user can also occur using a secure communication protocol. The returned CSRF token is stateless and is not stored in a server-side repository. When the trusted user later uses the HTML document to submit a request to access and/or manipulate data at the server, the CSRF token is included in such request. This may be accomplished by, for example, adding a hidden input field that includes the CSRF token to the submission that is transmitted to the server. If the server cannot validate the received token using the HMAC key that was originally used to generate the token, the request is considered unauthorized and is not processed. Numerous configurations and variations of such embodiments will be apparent in light of this disclosure.

A number of advantages are associated with certain of the disclosed embodiments. For instance, because the CSRF token is stateless and is not stored in any server-side repository, the subsequent server request that includes the CSRF token does not need to be validated by the same server that initially transmitted the HTML document to the trusted user and generated the token. Rather, any server having the HMAC key that was used to generate the token can later validate a received token. This makes it possible to implement such embodiments in conjunction with a cluster of load balanced servers. Enabling different servers to generate and validate the CSRF token therefore provides a degree of scalability that is lacking in existing systems, which often rely on interactions with a particular server. Likewise, because the CSRF token is not provided in the HTML document either, the trusted user can cache the page, including the JavaScript element which is later used to retrieve the CSRF token. The trusted user can therefore work offline without adversely affecting the CSRF defense framework. Existing systems that rely on web forms or HTML links to generate the token are not well-suited for caching and/or offline operations.

Other advantages are derived from the fact that certain embodiments do not require an HTML document to include any specific code that invokes the CSRF defense framework. The CSRF defense framework therefore appears transparent to developers who wish to add new components or functionality to the HTML document. In contrast, existing systems that rely on an unpredictable challenge token require relevant code in the HTML document to be manipulated, and can therefore be costly to implement and maintain. Moreover, because the JavaScript element obtains the token asynchronously, other scripts and functionality associated with the HTML document can operate independently of the CSRF defense framework, thus providing yet another layer of transparency that existing systems lack. The result is a CSRF protection framework that provides, among other things, scalability, cacheability, transparency, and offline support. These and other advantages will be apparent in view of the following detailed description.

As used herein, the term "token" refers, in addition to its ordinary meaning, to data that can be used to identify and/or authenticate a trusted client to a server. A token can therefore be understood as identifying a privilege (for example, a privilege of accessing a particular server or executing a particular script) associated with a user or computer holding the token. Tokens often consist of a randomly generated alphanumeric string of characters that would be difficult to guess using brute force methods. In certain embodiments the CSRF token comprises a stateless JWT object that is generated using a cryptographic technique such as a keyed HMAC algorithm. The authenticity of a token generated in this manner can be verified based on a secret, such as the HMAC key, thus eliminating any need to store the actual token in a repository. In such embodiments a client can authenticate itself to a web server simply by sending the token to the web server, for instance as a parameter in an HTTP GET or POST query. The web server uses the HMAC key to authenticate the token. A token can optionally be configured to expire after a specified period of time, or after a certain event has occurred. In applications where a token is used to defend against a CSRF attack, the terms "token" and "CSRF token" may be used interchangeably.

As used herein, the term "HMAC algorithm" refers, in addition to its ordinary meaning, to a technique for calculating a message authentication code using a cryptographic hash function in combination with a cryptographic key. The message authentication code can be understood as a token that can be used to authenticate a message and to provide integrity and authenticity assurances on the message. In certain embodiments the message authentication code functions as a CSRF token, as disclosed herein. This allows a server in possession of the cryptographic key to verify the authenticity and content of a CSRF token received from a client. In general, an HMAC algorithm operates by iteratively breaking up an encoded message into fixed-size blocks and then iteratively compressing the blocks using a compression function. In general, the cryptographic strength of an HMAC algorithm depends on the cryptographic strength of the underlying hash function, the size of the generated message authentication code, and the size and quality of the cryptographic key. A cryptographic key used in conjunction with an HMAC algorithm is referred to herein as an "HMAC key".

As used herein, the term "browser" refers, in addition to its ordinary meaning, to a software application that is capable of retrieving and rendering digital content obtained from a server. Content which is to be retrieved and rendered can be identified by a network address that is input by a user or that is selected from previously rendered content in the form of a hyperlink. An example of a network address is a uniform resource locator (URL). A browser may include both user interface elements that provide access to functionality associated with content consumption (such as scroll bars, menu bars, toolbars, and the like), as well as a browser window in which the rendered content appears. A browser window may or may not include a visible header. Browsers can be configured to render content stored according to a wide variety of file formats and protocols. The functionality provided by a content browser can be extended through the use of plugins and/or extensions which can be configured to, for example, execute a JavaScript element. A "web browser" is a class of browser that is specifically configured for retrieving and rendering digital content from a web server that is accessible via the World Wide Web (WWW), such as webpages, although many web browsers are also capable of accessing information provided by content servers in private networks and by file servers in a range of different file systems.

System Architecture

Figure 1:
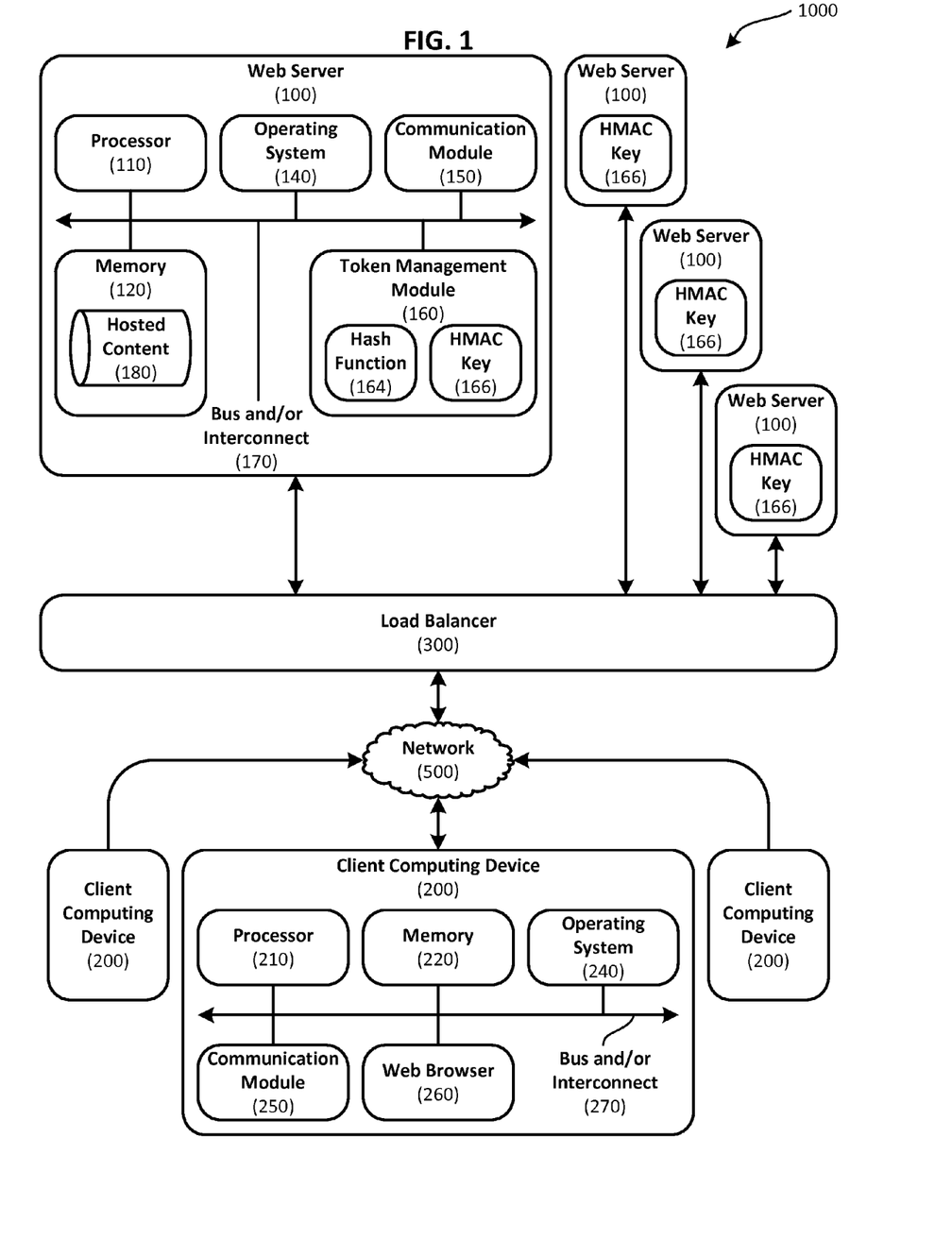
FIG. 1 is a block diagram schematically illustrating selected components of an example networked computer system that is capable of providing a defense against CSRF attacks.

FIG. 1 is a block diagram schematically illustrating selected components of an example networked computer system 1000 that is capable of providing a defense against CSRF attacks. Such embodiments can be understood as involving a series of interactions between a plurality of web servers 100 and a plurality of client computing devices 200. These interactions may occur via a network 500. While only four web servers 100 and three client computing devices 200 are illustrated in FIG. 1 for purposes of clarity, it will be appreciated that other embodiments may include tens, hundreds, thousands, or indeed, any suitable number of such devices. In an implementation wherein the plurality of web servers 100 comprise a server cluster, a load balancer 300 can be used to efficiently distribute requests from the plurality of client computing devices 200 to the plurality of web servers 100. The architecture and functionality of the various components and subcomponents comprising networked computer system 1000 will be described in turn. However, because the particular functionality provided in a given implementation may be specifically tailored to the demands of a particular application, this disclosure is not intended to be limited to provision or exclusion of any particular resources, components, or functionality. It should also be appreciated that the CSRF defense frameworks disclosed herein can be used outside the context of communications occurring over the WWW, and can also be implemented in other client-server computing environments wherein a server wishes to authenticate a client before servicing a request from the client.

In one embodiment web servers 100 comprise an array of enterprise class devices configured to store, process, and respond to client requests for hosted content 180 using HTTP. Hosted content 180 includes HTML documents, which in turn include elements such as images, style sheets, scripts, forms, and textual content. Web servers 100 are also capable of receiving content and instructions from clients, for example as a result of clients submitting web forms, uploading files, and performing other similar operations. Web servers 100 can also be used for monitoring and/or administering devices such as printers, routers, or webcams. Client computing devices 200, on the other hand, can be understood as comprising any of a variety of computing devices that are suitable for interaction with web servers 100, wherein such interaction includes requesting hosted resources, rendering content, submitting data, and executing scripts. For example, depending on the demands and use context associated with a particular implementation, client computing device 200 may comprise a handheld computer, a cellular telephone, a tablet computer, a smartphone, a laptop computer, a desktop computer, a digital media player, a set-top box, or any suitable combination of the foregoing.

Web servers 100 and client computing devices 200 each include one or more software modules configured to implement the various functionalities disclosed herein, as well as hardware that enables such implementation. Examples of enabling hardware include a processor 110, 210; a memory 120, 220; a communications module 150, 250; and a bus and/or interconnect 170, 270. Examples of implementing software include an operating system 140, 240, a token management module 160, and a web browser 260. Web servers 100 and client computing devices 200 are coupled to network 500 to allow for communications with each other, as well as with other networked computing devices and resources, such as a cloud-based storage repository or load balancer 300. For instance, load balancer 300 is optionally used to efficiently distribute client requests amongst a plurality of servers. In general, web servers 100 and client computing devices 200 can be local to network 500 or remotely coupled to network 500 by one or more other networks or communication channels.

Processor 110, 210 can be any suitable processor, and may include one or more coprocessors or controllers, such as an audio processor or a graphics processing unit, to assist in control and processing operations associated with web servers 100 and client computing devices 200. Memory 120, 220 can be implemented using any suitable type of digital storage, such as one or more of a disc drive, a redundant array of independent disks (RAID), a universal serial bus (USB) drive, flash memory, random access memory, or any suitable combination of the foregoing. Thus in certain embodiments memory 120, 220 comprises a distributed system of multiple digital storage devices, one or more of which may be remotely located. In the context of web servers 100, memory 120 can be used to store hosted content 180. In the context of client computing devices 200, memory 220 can be used to cache content that is received from web servers 100.

Operating system 140, 240 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with web servers 100 and client computing devices 200, and therefore may also be implemented using any suitable existing or subsequently developed platform. Communication module 150, 250 can be any appropriate network chip or chipset which allows for wired and/or wireless connection to network 500 and other computing devices and resources, such as load balancer 300. Communication module 150, 250 can also be configured to provide intra-device communications via bus and/or interconnect 170, 270.

Still referring to the example embodiment illustrated in FIG. 1, web servers 100 include a token management module 160 that is configured to generate a CSRF token using a keyed HMAC algorithm, and to later validate the generated CSRF token after it is received from one of client computing devices 200. The CSRF token can be generated by producing a stateless JWT using the keyed HMAC algorithm based on a suitable hash function 164 and a corresponding HMAC key 166. Examples of hash functions 164 which can be used in this regard include MD5 and SHA-1. As illustrated, HMAC key 166 is shared amongst the multiple web servers 100, thus making it possible to generate the CSRF token at one web server, and later authenticate that same token at a different web server using the shared HMAC key 166.

When hosted content is served to client computing device 200, such content can be rendered using web browser 260. Web browser 260 can be understood as comprising a software application that is capable of retrieving and rendering digital content obtained from a storage resource, such as provided by one or more of web servers 100. Content that is to be rendered can be identified by a network address, such as a URL, that is input by a user or that is selected from previously rendered content in the form of a hyperlink. In one particular embodiment web browser 260 is capable of rendering content encoded and transmitted using the HTML protocol, also referred to herein as an "HTML document". Examples of HTML protocols include HTML 5, WebSockets, and Web Real-Time Communication (Web RTC). Web browser 260 is also capable of executing a script, such as a JavaScript element configured to asynchronously request a CSRF token from web server 100, and store a received CSRF token inside the closure of the JavaScript element. Examples of commercially-available web browsers that can be used in this regard include Chrome (Google Inc., Mountain View, Calif.), Safari (Apple Inc., Cupertino, Calif.), and Internet Explorer (Microsoft Corp., Redmond, Wash.), although other existing or subsequently developed web browsers can be used in alternative implementations.

While client computing device 200 is illustrated in FIG. 1 as comprising web browser 260, in other embodiments the functionality associated with web browser 260 is additionally or alternatively provided by an electronic mail reader, a newsreader, a media player, a word processing application, and/or an ecommerce storefront application. In general, other types of software applications can be used to retrieve and render content in other embodiments, wherein the rendered content is stored according to any of a wide variety of different file formats and protocols. It will be appreciated that the embodiments disclosed herein are configured to work with a wide variety of existing and subsequently developed content browsers and communication protocols. Moreover, while FIG. 1 indicates that a particular client computing device has a single web browser running thereon, in alternative embodiments multiple web browsers may run simultaneously on a single client computing device.

Web servers 100 and client computing devices 200 are therefore configured to provide a client-server computing environment in which the various embodiments disclosed herein can be implemented. For instance, in one embodiment networked computer system 1000 comprises a globally distributed network of tens, hundreds, thousands, or more web servers 100 capable of delivering hosted content 180 over a network of secure communication channels to an even larger number of client computing devices 200. To this end, web servers 100 and client computing devices 200 can be configured to communicate with each other via network 500. Network 500 may comprise a local area network (such as a home-based or office network), a wide area network (such as the Internet), a peer-to-peer network (such as a Bluetooth connection), or a combination of such networks, whether public, private, or both. For example, in certain embodiments at least a portion of the functionality associated with network 500 is provided by a cellular data network, thereby making it easier for users of smartphones and tablet computers to leverage networked resources. In general, communications amongst the various entities and resources described herein may occur via wired and/or wireless connections, such as may be provided by Wi-Fi or mobile data networks. In some cases access to resources on a given network or computing system may require credentials such as a username and password, and/or may require compliance with any other suitable security mechanism.

The embodiments described herein can be implemented in various forms of hardware, software, firmware, and/or special purpose processors. For example, in one embodiment a non-transitory computer readable medium has instructions encoded thereon that, when executed by one or more processors, cause one or more of the CSRF defense frameworks described herein to be implemented. The instructions can be encoded using any suitable programming language, such as C, C++, object-oriented C, JavaScript, Visual Basic .NET, BASIC, or alternatively, using custom or proprietary instructions sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The CSRF defense framework disclosed herein can optionally be implemented in a variety of different computing environments beyond the delivery of content from a web server to a web browser hosted at a client computing device. In particular, it is possible to use a token management module configured to use a CSRF token as described herein outside the context of web-based communications. Furthermore, the functionality disclosed herein may be organized using any number of different modules, sub-modules or other components of distinct functionality, and can provide information to, or receive information from, still other components and services. More generally, other components and functionalities not reflected in the illustrations will be apparent in light of this disclosure, and it will be appreciated that the present disclosure is not intended to be limited to any particular hardware or software configuration. Thus in other embodiments the components illustrated in FIG. 1 may comprise additional, fewer, or alternative subcomponents.

The aforementioned non-transitory computer readable medium may be any suitable medium for storing digital information, such as a hard drive, a server, a flash memory, and/or random access memory. In alternative embodiments, the computers and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and/or firmware can be used, and that the present disclosure is not intended to be limited to any particular system architecture.

Methodology

Figure 2A:
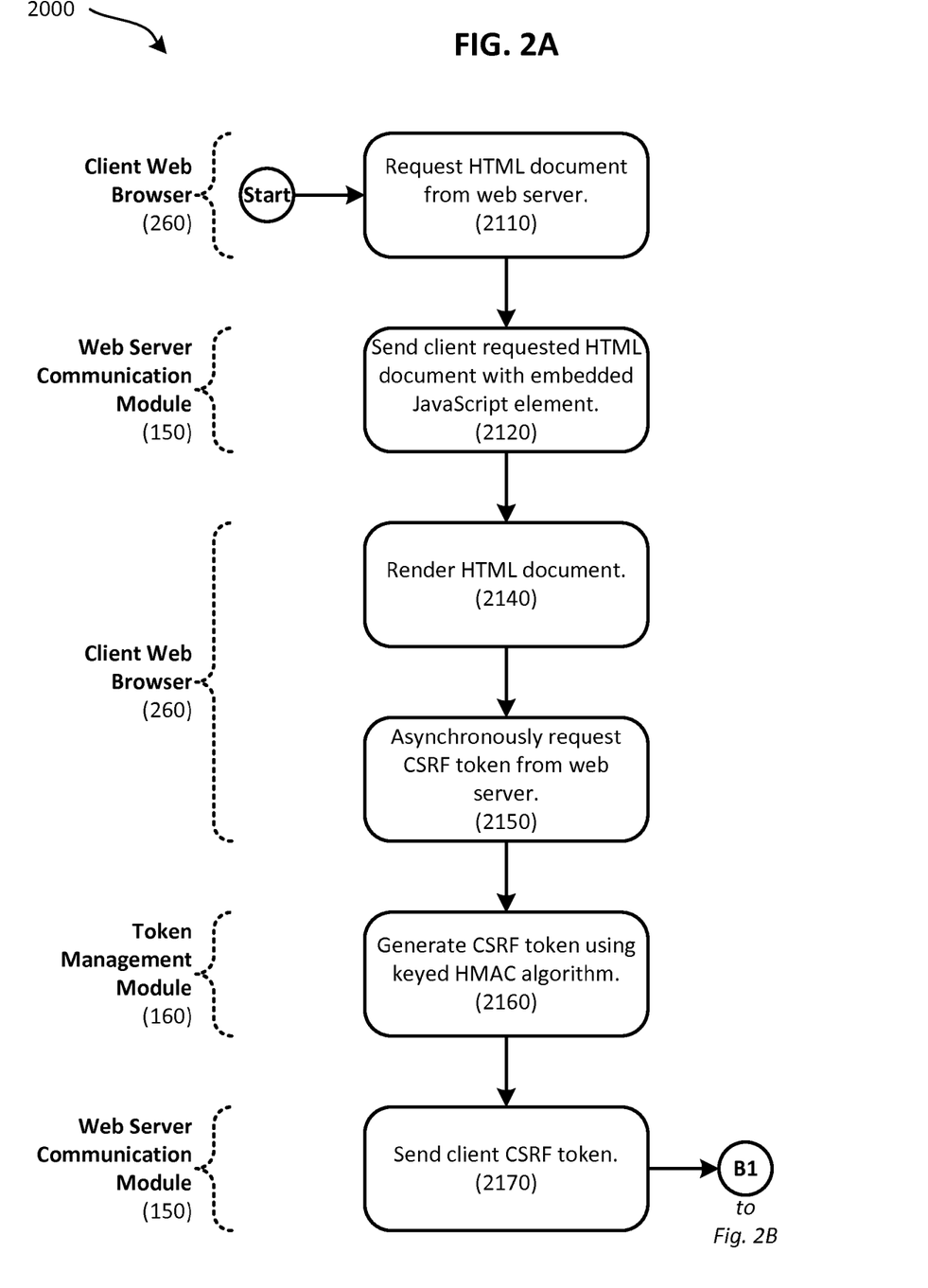
FIGS. 2A and 2B comprise a flowchart illustrating an example CSRF defense method for communication between a web server and a client computing device that is resistant to CSRF attacks.
Figure 2B:
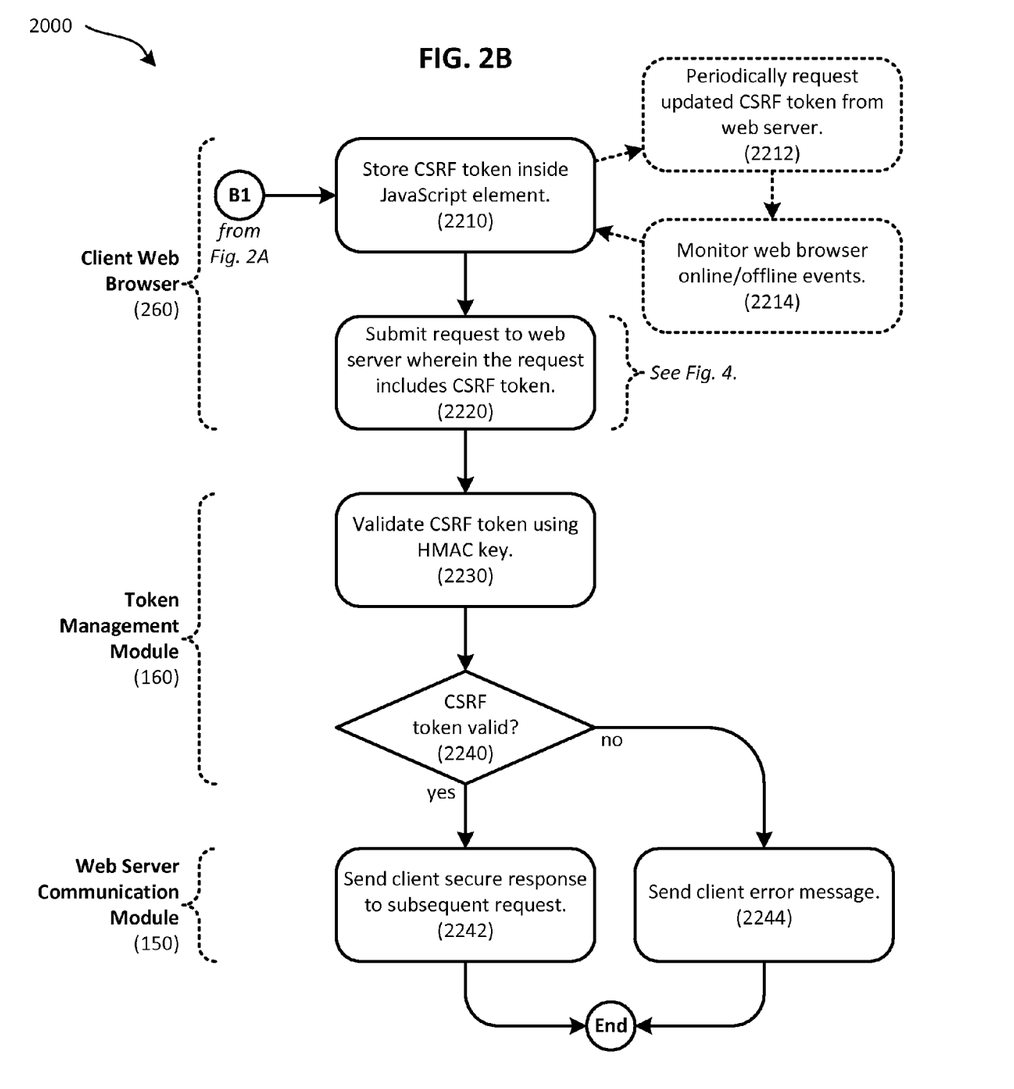
Figure 3:
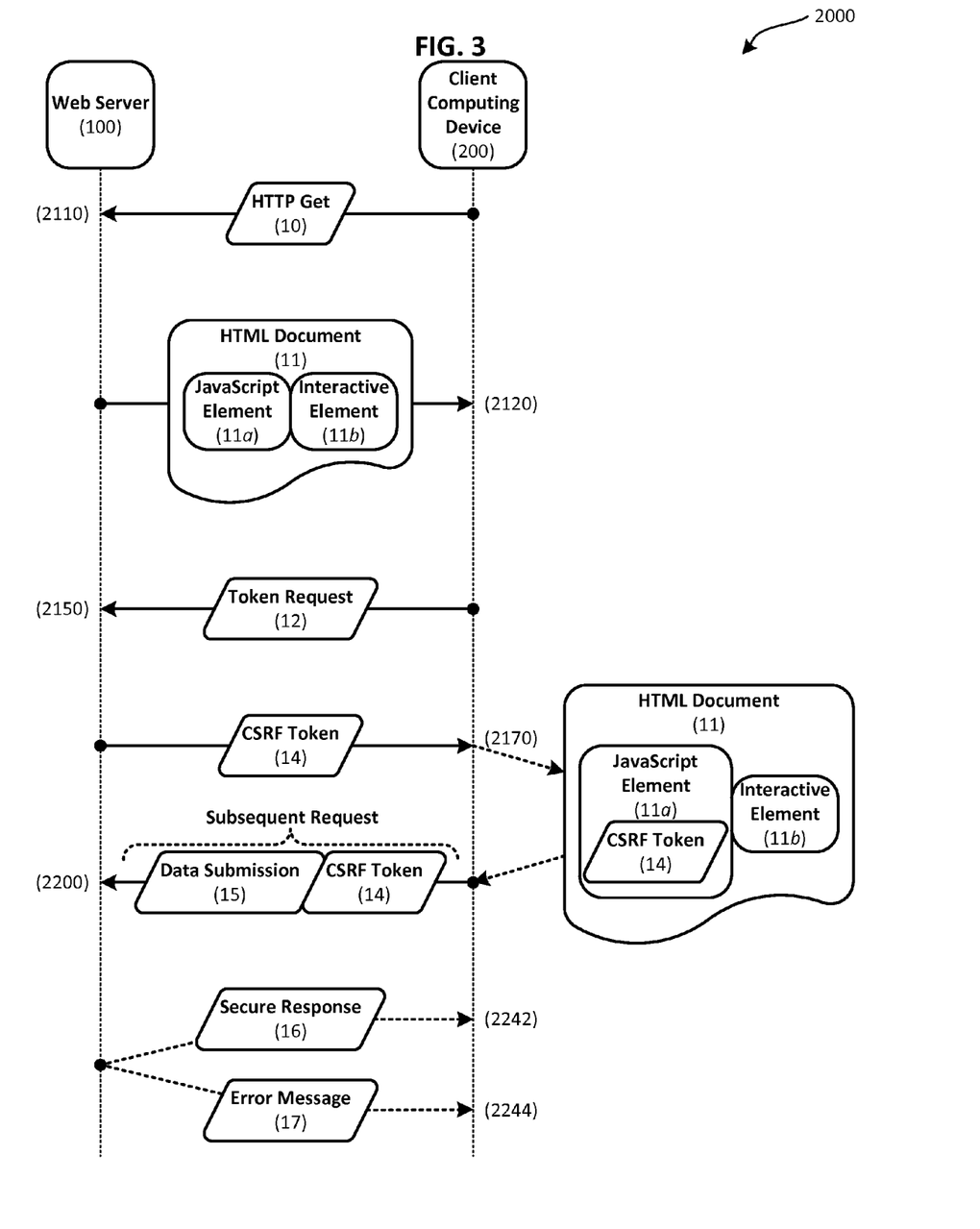
FIG. 3 is a data flow diagram schematically illustrating an example sequence of communications between a web server and a client computing device, wherein certain of the communications use a CSRF token in a way that deters CSRF attacks.

FIGS. 2A and 2B comprise a flowchart illustrating an example CSRF defense method 2000 for communication between web server 100 and client computing device 200, the method being resistant to CSRF attacks. FIG. 3 is a data flow diagram schematically illustrating an example sequence of communications that occur when CSRF defense method 2000 is invoked, wherein certain of the communications use a CSRF token in a way that deters CSRF attacks. As can be seen, CSRF defense method 2000 includes a number of phases and sub-processes, the sequence of which may vary from one embodiment to another. However, when considered in the aggregate, these phases and sub-processes provide a complete CSRF defense framework that is responsive to user input in accordance with certain of the embodiments disclosed herein. CSRF defense method 2000 can be implemented, for example, using the system architecture illustrated in FIG. 1 and described herein. However other system architectures can be used in other embodiments, as will be apparent in light of this disclosure. To this end, the correlation of the various functionalities illustrated in FIGS. 2A and 2B to the specific components illustrated in FIG. 1 is not intended imply any structural and/or use limitations. Rather, other embodiments may include, for example, varying degrees of integration wherein multiple functionalities are effectively performed by one system or module. Thus other embodiments may have fewer or more modules depending on the granularity of implementation. Likewise, alternative communication sequences beyond those illustrated in FIG. 3 may be invoked as well. In general, numerous variations and alternative configurations will be apparent in light of this disclosure.

As illustrated in FIGS. 2A and 3, CSRF defense method 2000 can be understood as commencing with web browser 260 of client computing device 200 requesting an HTML document 11 from web server 100. See reference numeral 2110 in FIGS. 2A and 3. This can be accomplished using any suitable HTTP request that specifies a network address identifying HTML document 11, such as an HTTP GET request 10 that specifies a particular network URL. In general, HTML document 11 may include one or more active and/or static content elements, examples of which may include images, multimedia objects, style sheets, scripts, forms, and textual content. In many cases HTML document 11 will be configured to provide specific functionality that the client wishes to invoke, such as a form configured to execute a financial transaction. In some cases HTML document 11 forms part of hosted content 180 stored at web server 100, while in other cases web server 100 is configured to obtain HTML document 11 from another networked storage resource.

In response to receiving the HTTP GET request 10, web server communication module 150 is configured to send HTML document 11 to client computing device 200. See reference numeral 2120 in FIGS. 2A and 3. The requested HTML document 11 includes an embedded script, such as a JavaScript element 11*a*, that can later be used to request a CSRF token, as will be described in turn. And as noted previously, HTML document 11 also optionally includes one or more other interactive elements 11*b*, such as a fillable form or a media player, that can be used to provide specific functionality to the client. Once HTML document 11 is received at client computing device 200, client web browser 260 may render HTML document 11. See reference numeral 2140 in FIG. 2A. In some implementations HTML document 11 is rendered in response to being received at client computing device 100, thus giving the impression of near-instantaneous content delivery to the client. However in other implementations HTML document 11 may additionally or alternatively be cached in memory 220, thereby enabling it to be rendered at a later time. Caching of requested content is particularly useful in applications where the client may wish to render the content at a time when web server 100 is inaccessible.

In response to receipt of HTML document 11 at client computing device 200, client web browser 260 is configured to execute JavaScript element 11*a*, thus transmitting an asynchronous CSRF token request 12 to web server 100. See reference numeral 2150 in FIGS. 2A and 3. This can be accomplished, for example, by sending another HTTP GET request to web server 100. Asynchronously transmitting CSRF token request 12 advantageously allows the token to be requested transparently from the client's perspective, and thus operates independently of other interactions between the client and HTML document 11.

Upon receipt of CSRF token request 12, token management module 160 generates a CSRF token 14 using a keyed HMAC algorithm that takes HMAC key 166 as input. See reference numeral 2160 in FIG. 2A. In one embodiment CSRF token 14 comprises an alphanumeric string of characters that would be difficult to guess using brute force methods. As illustrated in FIG. 1, in embodiments wherein client requests are handled by a server cluster, the same HMAC key 166 resides at each of the plurality of servers comprising the cluster. As a consequence, the content of the generated CSRF token 14 is independent of the particular web server that actually handled token request 12 and generated token 14. In such implementations the resulting CSRF token 14 is stateless, and therefore is not tied to any particular one of the plurality of web servers 100. Once CSRF token 14 has been generated, web server communication module 150 is configured to send token 14 to client computing device 200. See reference numeral 2170 in FIGS. 2A and 3. In such embodiments there is no need to retain CSRF token 14 at web server 100, thus providing a degree of horizontal scalability since subsequent operations to authenticate token 14 can be handled by any of the plurality of web servers 100 having a copy of HMAC key 166. This is particularly useful in load balanced implementations wherein it is uncertain which one of the plurality of web servers 100 may be called on to handle a subsequent authentication request. Once CSRF token 14 is received at client computing device 200, client web browser 260 stores token 14 within JavaScript element 11*a*. See reference numeral 2210 in FIG. 2B. This can be accomplished, for example, by storing CSRF token 14 in a protected variable inside the closure of JavaScript element 11*a* itself. The result, illustrated in FIG. 3, is that HTML document 11 includes JavaScript element 11*a*, which in turn includes CSRF token 14.

The features of CSRF defense method 2000 described to this point enable content to be acquired from web server 100 and enable CSRF token 14 to be generated and stored within the acquired content when the client renders the content. Once generated and stored, CSRF token 14 is then used to authenticate a subsequent user interaction with the acquired content. Examples of such subsequent interactions include submitting data via an HTML form, executing a script, or uploading a file. The subsequent interaction may occur immediately after CSRF token 14 is sent to client computing device 200, or may occur several minutes, hours, days, or weeks thereafter. Indeed one of the advantages of method 2000 is that it allows a subsequent interaction to be authenticated without maintaining an active session between client and server, thus providing a degree of cacheability that existing CSRF defense frameworks lack. In particular, because token 14 is not provided as part of HTML document 11 that is retrieved from web server 100, but is instead retrieved in a separate interaction using JavaScript element 11*a*, this enables client computing device 200 to cache HTML document 11 without adversely affecting the security of the CSRF defense framework.

Because the subsequent user interaction may occur after an indeterminate delay, CSRF defense method 2000 is optionally configured to handle events such as an expiring token or an intermittently connected client computing device. For example, in some implementations CSRF token 14 will be configured to expire after a period of validity that is known to client computing device 200. If the subsequent interaction occurs after this period of validity, then there is a danger than an expired token will be submitted to the web server 100, thus preventing web server 100 from processing the subsequent interaction. This may to occur, for example, where HTML document 11 comprises an HTML form that requires client interaction for a period that is longer than the period of validity. To address this potential failure, JavaScript element 11*a* optionally includes an interval function that periodically requests an updated token from web server 100. See reference numeral 2212 in FIG. 2B. Such request is made before the period of validity expires. This reduces the likelihood that an expired token is later submitted to web server 100.

Periodically requesting an updated CSRF token may fail where client computing device 200 loses network connectivity, which is particularly likely to occur in applications implemented using smartphones, tablet computers, or other portable devices. Thus in certain embodiments the aforementioned interval function is configured to monitor client web browser 260 for events indicating that client computing device 200 has lost or reacquired network connectivity. See reference numeral 2214 in FIG. 2B. HTML 5, for example, provides online/offline event detection that facilitates a determination whether client web browser 260 is in communication with web server 100. Where CSRF token expires while network connectivity is unavailable, interval function can be configured to wait until a browser event is detected that indicates that network connectivity has been reestablished. Once such event is detected, interval function requests the updated CSRF token. This allows any subsequent interactions to be successfully authenticated by web server 100 notwithstanding the delay since the original HTML document was served to client, or any intervening breaks in network connectivity.

As described above, at some point in the future client web browser 260 can be used to invoke a subsequent interaction with HTML document 11. In one implementation this is accomplished by using HTML document 11, for example as rendered in client web browser 260, to submit a request to one of web servers 100, wherein the request includes CSRF token 14. See reference numeral 2220 in FIGS. 2B and 3. As noted previously, the subsequent request need not be submitted to the same web server that was originally used to generate CSRF token 14 submitted with the request. This facilitates implementation of method 2000 using a server cluster that is managed by load balancer 300. In general, the subsequent request will be generated as a result of a user interaction with HTML document 11 in which JavaScript element 11a resides, and in which CSRF token 14 is stored. For example, in an implementation wherein the subsequent user interaction comprises entering data in a finable HTML form included in HTML document 11, the subsequent request will include a data submission 15 derived from the entered data, as well as CSRF token 14.

Figure 4:
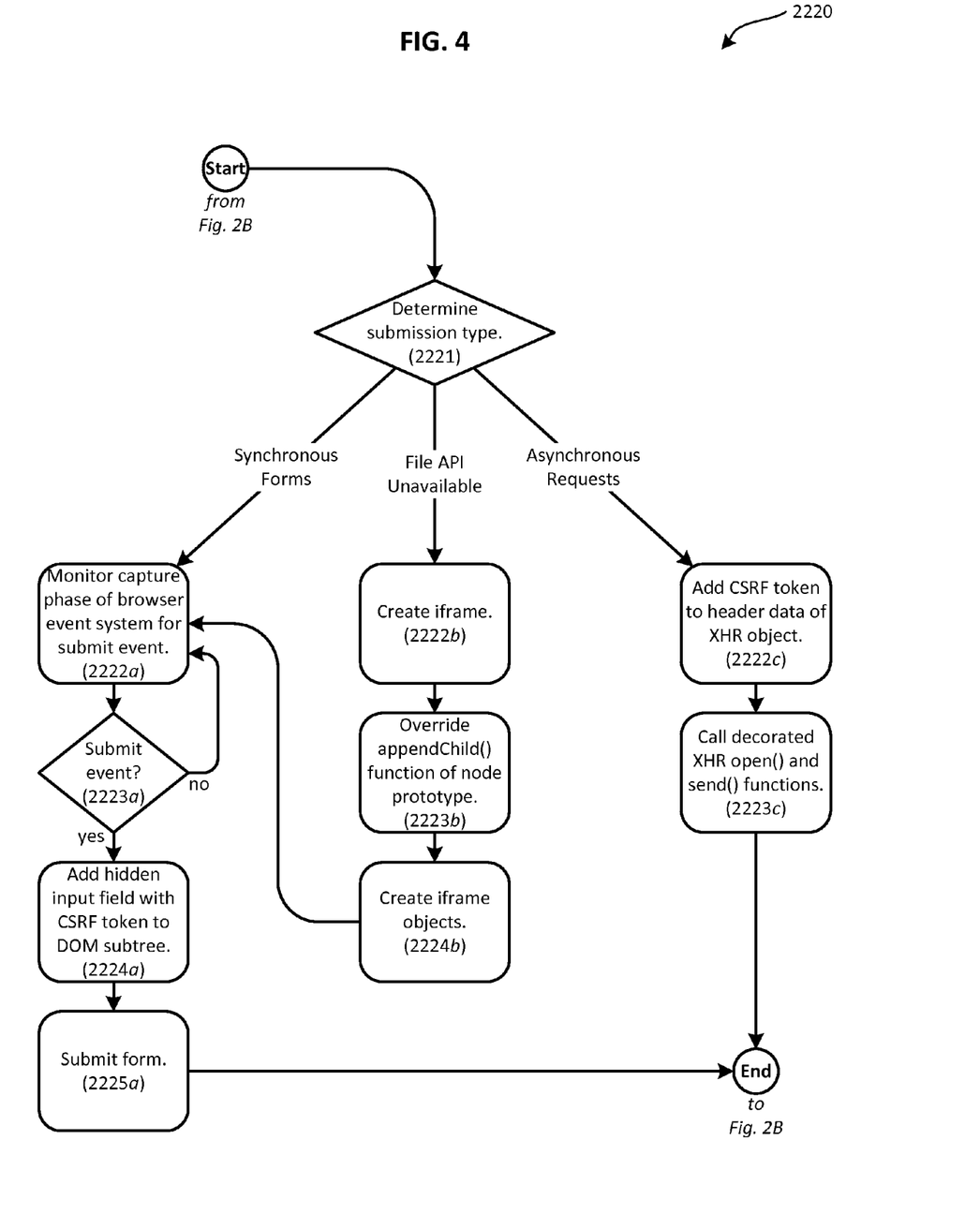
FIG. 4 is a flowchart illustrating an example method for including a CSRF token in a subsequent request that is submitted to a web server, wherein the subsequent request is generated as a result of a user interaction with an HTML document that includes the CSRF token.

FIG. 4 is a flowchart illustrating an example CSRF token embedding method 2220 that can be used to include CSRF token 14 in the subsequent request that is submitted to web server 100. The specific features of CSRF token embedding method 2220 may vary depending on the particular way client web browser 260 communicates with web server 100. CSRF token embedding method 2220 can therefore be understood as commencing with a determination of how client web browser 260 will communicate the subsequent request to web server 100. See reference numeral 2221 in FIG. 4. For example, the subsequent request may be submitted by (a) monitoring user interaction with synchronous forms, (b) manipulating inline frames to upload one or more files, or (c) using an XMLHttpRequest (XHR) object to make an asynchronous request. Other techniques for making the subsequent request can be used in other implementations. In general, however, CSRF token 14 is submitted in a way that is transparent to both the client and the developer of HTML document 11, thereby eliminating any need for the developer to manipulate the structure of HTML document 11 to maintain the integrity of the CSRF defense framework disclosed herein.

In many applications HTML document 11 will include one or more HTML forms that can be used to collect information that will later form part of data submission 15 that is transmitted to web server 100. Such use of HTML forms is particularly common in conjunction with executing secure transactions, such as financial transactions, and therefore protocols for processing and submitting the collected data are well-established. For example, after a user has entered data into the form and invoked an action to submit the data, an HTTP POST request can be used to transmit the collected data to web server 100. When these existing protocols are invoked in the context of CSRF defense method 2000 described herein, CSRF token 14 should be included in the form data submission 15. Thus in certain embodiments JavaScript element 11a is configured to monitor the capture phase of the browser event system for an HTML form submission event. See reference numeral 2222a in FIG. 4. This allows the JavaScript element 11a to detect the occurrence of form submission events. See reference numeral 2223a in FIG. 4. Once a form submission event is detected, a hidden input field is added to the document object model (DOM) subtree of the HTML form submission. See reference numeral 2224a in FIG. 4. CSRF token 14 is added to this hidden input field, thus causing it to be included in the submission that is transmitted to web server 100. The form data is submitted to web server 100 using a default browser submission mechanism, such as an HTTP POST request. See reference numeral 2225a in FIG. 4. CSRF token 14 thus accompanies data submission 15, as illustrated in FIG. 3.

In some cases HTML document 11 will include functionality that allows a user to upload a file to web server 100. The file upload operation corresponds to data submission 15 illustrated in FIG. 3. This is another example of a submission event that can be detected and decorated with a hidden input field that includes CSRF token 14, as described previously in the context of HTML form submissions. However, in some implementations, particularly when an older version of web browser 260 is used, a robust file application programming interface (API) may not be available. In this case, one common technique used for uploading files asynchronously is to create an inline frame ("iframe") and invoke the HTTP POST request from within the iframe instead of from within the main HTML document itself. The HTTP POST request is still processed synchronously within the iframe, but the user is nevertheless provided with a similar result as is obtained with an asynchronous request executed in a web browser with a more robust file API. When this iframe manipulation technique is invoked in the context of CSRF defense method 2000 described herein, CSRF token 14 should be included with the file upload data submission 15. Thus in certain embodiments an iframe is created in response to determining that a file API is unavailable for a file upload operation. See reference numeral 2222b in FIG. 4. The appendChild( ) function of the node prototype in the iframe is overridden. See reference numeral 2223b in FIG. 4. At this point, the iframe objects can be created, including objects that enable synchronous HTTP POST requests to be fulfilled. See reference numeral 2224b in FIG. 4. Once the iframe objects are created, the capture phase of the browser event system can be monitored for submit events, as described herein.

In some cases complex asynchronous HTTP requests will be invoked using an XHR object. XHR objects allow data received from a web server 100 to (a) be evaluated by client-side scripting, as well as (b) alter an HTTP document without requiring a page reload. HTTP requests invoked using an XHR object are initialized using an open( ) function which is executed before the actual request is transmitted. A send( ) function is then used to actually transmit the request to web server 100. When asynchronous HTTP requests using an XHR object are invoked in the context of CSRF defense method 2000, CSRF token 14 should be included when the request is transmitted to web server 200. This can be accomplished by invoking a decorating function which is included in JavaScript element 11a. The decorating function is configured to add CSRF token 14 to the header data of the XHR object. See reference numeral 2222c in FIG. 4. Once this is complete, the decorated open( ) and send( ) functions are then called. See reference numeral 2223c in FIG. 4. In an alternative embodiment a framework or layer can be applied before processing the XHR object, although decorating the open( ) and send( ) functions avoids configuring other code in HTML document 11 to use such an additional layer. Decorating the open( ) and send( ) functions thus allows existing code to continue to function without modification, while still including CSRF token 14 in the asynchronous HTTP request automatically, thus providing a degree of transparency to the CSRF framework. Such techniques are not limited to use with HTTP POST requests, and indeed can be invoked with a wide range of different HTTP verbs.

Once CSRF token 14 is received at web server 100, token management module 160 is configured to validate CSRF token 14 using HMAC key 166. See reference numeral 2230 in FIG. 2B. Any one of the plurality of web servers 100 that have HMAC key 166 can make a determination with respect to the validation of CSRF token 14. See reference numeral 2240 in FIG. 2B. It is therefore unnecessary to route token 14 to the particular server that initially generated token 14. If CSRF token is validated, data submission 15 received from client computing device 200 can be processed in accordance with the subsequent request. Web server communication module 150 optionally sends a secure response 16 to client computing device 200. See reference numeral 2242 in FIGS. 2B and 3. On the other hand, if CSRF token 14 cannot be validated, or if the subsequent request does not include any CSRF token, the subsequent request is not processed and web server communication module 150 is configured to send an error message 17 to client computing device 200. See reference numeral 2244 in FIGS. 2B and 3. In one implementation error message 17 comprises a message indicating HTTP 401 or 403 status code.

Further Example Embodiments

Numerous variations and configurations will be apparent in light of this disclosure. For instance, one example embodiment provides a computer-implemented method for defending against a CSRF attack. The method comprises serving a content item to a client computing device. The content item includes an embedded executable script. The method further comprises receiving an asynchronous request for a CSRF token from the client computing device. The asynchronous request is generated as a result of running the embedded executable script at the client device. The method further comprises generating the CSRF token in response to the asynchronous request. The CSRF token is generated using a HMAC key. The method further comprises sending the CSRF token to the client computing device. The method further comprises receiving, from the client computing device, a request to access a resource provided by a server computing device. The request includes the CSRF token. The method further comprises determining whether the received CSRF token can be authenticated using the HMAC key. In some cases (a) the CSRF token is generated by the server computing device; and (b) the CSRF token is not retained at the server computing device after being sent to the client computing device. In some cases the content item is an HTML document that is served to the client computing device from a web browser. In some cases the embedded executable script is a JavaScript element. In some cases the method further comprises granting access to the resource in response to determining that the received CSRF token can be authenticated using the HMAC key. In some cases (a) the CSRF token is generated by a first server computing device; and (b) determining whether the received CSRF token can be authenticated is performed by a second computing device.

Another example embodiment provides a CSRF defense system that comprises a server cluster having a plurality of server computing devices. Each of the server computing devices includes a processor. The plurality of processors are configured to collectively execute instructions that cause the server cluster to invoke a CSRF defense process. Each of the server computing devices further includes a memory storing a HMAC key. The HMAC key is stored in each of the memories is functionally equivalent. The CSRF defense process comprises serving a content item to a client computing device. The content item includes an executable script. The CSRF defense process further comprises receiving a request for a CSRF token from the client computing device. The request is generated in response to running the executable script at the client computing device. The CSRF defense process further comprises generating the CSRF token in response to the request. The CSRF token is generated using the HMAC key. The CSRF defense process further comprises sending the CSRF token to the client computing device. The CSRF defense process further comprises receiving, from the client computing device, a subsequent request to access a resource provided by one of the plurality of server computing devices. The subsequent request includes the CSRF token. The CSRF defense process further comprises determining whether the CSRF token received with the subsequent request can be authenticated using the HMAC key. In some cases the subsequent request is generated in response to a user interaction with the content item at the client computing device. In some cases the system further comprises a load balancer configured to route the request to a first one of the plurality of server computing devices, and to route the subsequent request to a second one of the plurality of server computing devices. In some cases (a) the content item is an HTML document that includes a fillable HTML form; (b) the subsequent request further includes a data submission generated based on data entered into the fillable HTML form; and (c) the CSRF defense process further comprises processing the data submission in response to determining that the CSRF token can be authenticated using the HMAC key. In some cases (a) the subsequent request further includes a data submission generated based on a user interaction with the content item; and (b) the CSRF defense process further comprises, in response to determining that the CSRF token cannot be authenticated using the HMAC key, sending the client computing device an error message indicating that the data submission has not been processed.

Another example embodiment provides a computer program product encoded with instructions that, when executed by one or more processors, causes a CSRF defense process to be carried out. The CSRF defense process comprises requesting a content item from a server cluster. The process further comprises receiving the requested content item from the server cluster. The received content item includes a JavaScript element. The process further comprises rendering the received content item in a content browser. The process further comprises executing the JavaScript element. The process further comprises, as a result of executing the JavaScript element, requesting a CSRF token from the server cluster. The process further comprises receiving the CSRF token from the server cluster. The process further comprises storing the received CSRF token in the JavaScript element. The process further comprises submitting, to the server cluster, a subsequent request for access to a resource provided by the server cluster. The subsequent request includes the CSRF token. In some cases submitting the subsequent request to the server cluster comprises (a) monitoring a capture phase of the content browser; (b) detecting a submit event generated in response to a user interaction with the content browser; and (c) adding a hidden input field to the content item, wherein the hidden input field includes the CSRF token. In some cases storing the received CSRF token in the JavaScript element comprises storing the CSRF token in a protected variable that is defined in the JavaScript element. In some cases the CSRF defense process further comprises (a) making a determination that the received CSRF token is subject to an expiration event; and (b) requesting an updated CSRF token from the server cluster before the expiration event occurs. In some cases (a) making a determination that the received CSRF token is subject to an expiration event; (b) making a determination that network connectivity to the server cluster is unavailable; (c) detecting that network connectivity to the server cluster has been reestablished; and (d) requesting an updated CSRF token from the server cluster in response to detecting that network connectivity to the server cluster has been reestablished. In some cases the content item is an HTML document that is received from a web server and rendered in a web browser. In some cases requesting the content item from the server cluster comprises submitting a request for the content item to a load balancer configured to route the request to one of a plurality of server computing devices comprising the server cluster. In some cases the JavaScript element is executed in response to rendering the content item in the content browser. In some cases the CSRF defense process further comprises caching the received content item in a memory before rendering the received content item.

The foregoing detailed description has been presented for the purposes of illustration and description. It is not intended to be exhaustive or to limit the invention to the particular disclosed embodiments. Many modifications and variations are possible in light of this disclosure. Thus it is intended that the scope of the invention be defined not by this detailed description, bur rather by the claims appended hereto.

What is claimed is:

1. A computer-implemented method for defending against a cross-site request forgery (CSRF) attack, the method comprising:
   serving a content item to a client computing device, wherein the content item includes an embedded executable script;
   receiving a first asynchronous request for a first CSRF token from the client computing device, wherein the first asynchronous request is generated as a result of running the embedded executable script at the client computing device;
   generating the first CSRF token in response to the first asynchronous request, wherein the first CSRF token is generated using a hash message authentication code (HMAC) key, and wherein the first CSRF token is subject to an expiration event;
   sending the first CSRF token to the client computing device;
   receiving a second asynchronous request for an updated CSRF token from the client computing device, wherein the second asynchronous request is received after network connectivity with the client computing device is temporarily lost after sending the first CSRF token to the client computing device;
   generating the updated CSRF token in response to the second asynchronous request, wherein the updated CSRF token is also generated using the HMAC key;
   receiving, from the client computing device, a request to access a resource provided by a server computing device, wherein the request includes a received CSRF token; and
   determining whether the received CSRF token can be authenticated using the HMAC key.

2. The method of claim 1, wherein:
   the method further comprises sending the updated CSRF token to the client computing device;
   the first CSRF token and the updated CSRF token are generated by the server computing device; and
   neither the first CSRF token nor the updated CSRF token are retained at the server computing device after being sent to the client computing device.

3. The method of claim 1, wherein the content item is an HTML document that is served to the client computing device from a web server.

4. The method of claim 1, wherein the embedded executable script is a JavaScript element.

5. The method of claim 1, further comprising granting access to the resource in response to determining that the received CSRF token can be authenticated using the HMAC key.

6. The method of claim 1, wherein:
   the first CSRF token and the updated CSRF token are generated by a first server computing device; and
   determining whether the received CSRF token can be authenticated is performed by a second computing device.

7. A cross-site request forgery (CSRF) defense system that comprises a server cluster having a plurality of server computing devices, each of the server computing devices including
   a processor, wherein the plurality of processors are configured to collectively execute instructions that cause the server cluster to invoke a CSRF defense process; and
   a memory storing a hash message authentication code (HMAC) key, wherein the HMAC key stored in each of the memories is functionally equivalent;
   wherein the CSRF defense process comprises:
      serving a content item to a client computing device, wherein the content item includes an executable script;
      receiving a first request for a first CSRF token from the client computing device, wherein the first request is generated in response to running the executable script at the client computing device;
      generating the first CSRF token in response to the first request, wherein the first CSRF token is generated using the HMAC key, and wherein the first CSRF token is subject to an expiration event;
      sending the first CSRF token to the client computing device;
      receiving a second request for an updated CSRF token from the client computing device, wherein the second request is received after network connectivity with the client computing device is temporarily lost after sending the first CSRF token to the client computing device;
      generating the updated CSRF token in response to the second request, wherein the updated CSRF token is also generated using the HMAC key;
      receiving, from the client computing device, a subsequent request to access a resource provided by one of the plurality of server computing devices, wherein the subsequent request includes a received CSRF token; and
      determining whether the received CSRF token can be authenticated using the HMAC key.

8. The CSRF defense system of claim 7, wherein the subsequent request is generated in response to a user interaction with the content item at the client computing device.

9. The CSRF defense system of claim 7, further comprising a load balancer configured to route at least one of the first and second requests to a first one of the plurality of server computing devices, and to route the subsequent request to a second one of the plurality of server computing devices.

10. The CSRF defense system of claim 7, wherein:
the content item is an HTML document that includes a fillable HTML form;
the subsequent request further includes a data submission generated based on data entered into the fillable HTML form; and
the CSRF defense process further comprises processing the data submission in response to determining that the received CSRF token can be authenticated using the HMAC key.

11. The CSRF defense system of claim 7, wherein:
the subsequent request further includes a data submission generated based on a user interaction with the content item; and
the CSRF defense process further comprises, in response to determining that the received CSRF token cannot be authenticated using the HMAC key, sending the client computing device an error message indicating that the data submission has not been processed.

12. A computer program product comprising a non-transitory computer-readable medium storing instructions that, when executed by one or more processors, causes a cross-site request forgery (CSRF) defense process to be carried out, the process comprising:
requesting a content item from a server cluster;
receiving the requested content item from the server cluster, wherein the received content item includes a JavaScript element;
rendering the received content item in a content browser;
executing the JavaScript element;
as a result of executing the JavaScript element, requesting a CSRF token from the server cluster;
receiving the CSRF token from the server cluster;
storing the received CSRF token in the JavaScript element;
making a first determination that the received CSRF token is subject to an expiration event;
making a second determination that network connectivity to the server cluster is unavailable;
detecting that network connectivity to the server cluster has been reestablished;
requesting an updated CSRF token from the server cluster in response to detecting that network connectivity to the server cluster has been reestablished; and
submitting, to the server cluster, a subsequent request for access to a resource provided by the server cluster, wherein the subsequent request includes the updated CSRF token.

13. The computer program product of claim 12, wherein submitting the subsequent request to the server cluster comprises:
monitoring a capture phase of the content browser;
detecting a submit event generated in response to a user interaction with the content browser; and
adding a hidden input field to the content item, wherein the hidden input field includes the updated CSRF token.

14. The computer program product of claim 12, wherein storing the received CSRF token in the JavaScript element comprises storing the received CSRF token in a protected variable that is defined in the JavaScript element.

15. The computer program product of claim 12, wherein the updated CSRF token is requested from the server cluster before the expiration event occurs.

16. The computer program product of claim 12, wherein the content item is an HTML document that is received from a web server and rendered in a web browser.

17. The computer program product of claim 12, wherein requesting the content item from the server cluster comprises submitting an initial request for the content item to a load balancer configured to route the initial request to one of a plurality of server computing devices comprising the server cluster.

18. The computer program product of claim 12, wherein the JavaScript element is executed in response to rendering the content item in the content browser.

19. The computer program product of claim 12, wherein the CSRF defense process further comprises caching the received content item in a memory before rendering the received content item.

* * * * *